July 14, 1959   H. T. BOOTH ET AL   2,894,526
PRESSURE REGULATING VALVE

Filed July 26, 1954   2 Sheets-Sheet 1

INVENTORS
Harry T. Booth
Thomas J. Lord
BY
Their ATTORNEY

July 14, 1959     H. T. BOOTH ET AL     2,894,526
PRESSURE REGULATING VALVE
Filed July 26, 1954     2 Sheets-Sheet 2

INVENTORS
Harry T. Booth
BY Thomas J. Lord
J. E. Beringer
Their ATTORNEY

United States Patent Office 2,894,526
Patented July 14, 1959

2,894,526
PRESSURE REGULATING VALVE

Harry T. Booth, Dayton, and Thomas J. Lord, Middletown, Ohio, assignors to United Aircraft Products, Inc., Dayton, Ohio, a corporation of Ohio Application July 26, 1954, Serial No. 445,584

3 Claims. (Cl. 137—116.5)

This invention relates to pressure regulator valves, and particularly to devices of this class as used in the pressurizing of hydraulic system reservoirs. While not so limited, the invention has especial application to the hydraulic control systems of aircraft and the like in which air for pressurizing the hydraulic reservoir is supplied in a relatively wide pressure range.

It is an object of the invention to provide a regulator device for the purpose described which is relatively small and compact and which embodies in itself the means for performing its several functions in the hydraulic system.

Another object of the invention is to provide a device of the class described operative under severe and exacting environmental conditions, including ambient temperatures ranging as low as —65° F.

A further object of the invention is to provide a device of the kind described functioning: (a) as an air pressure regulator; (b) as an air or oil pressure relief valve; (c) as a vacuum relief valve; and (d) as an air or oil check valve.

Figure 2:
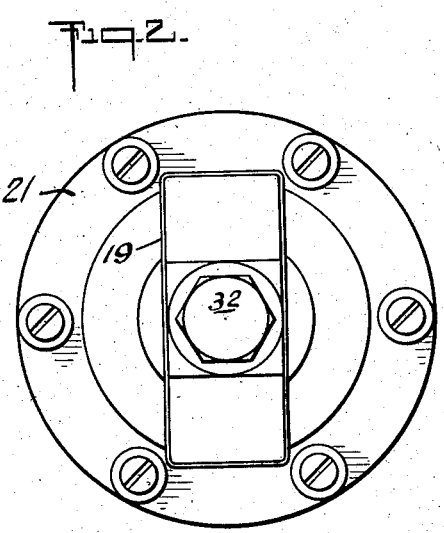
Fig. 2 is a top plan view of the valve of Fig. 1.
Figure 3:
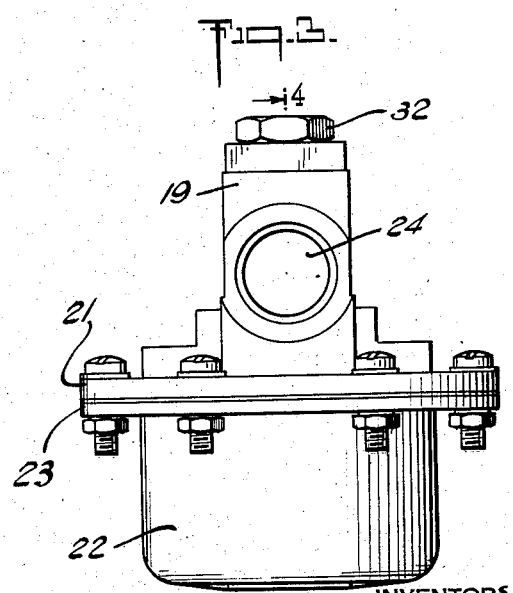
Fig. 3 is a view of the same valve in side elevation.
Figure 4:
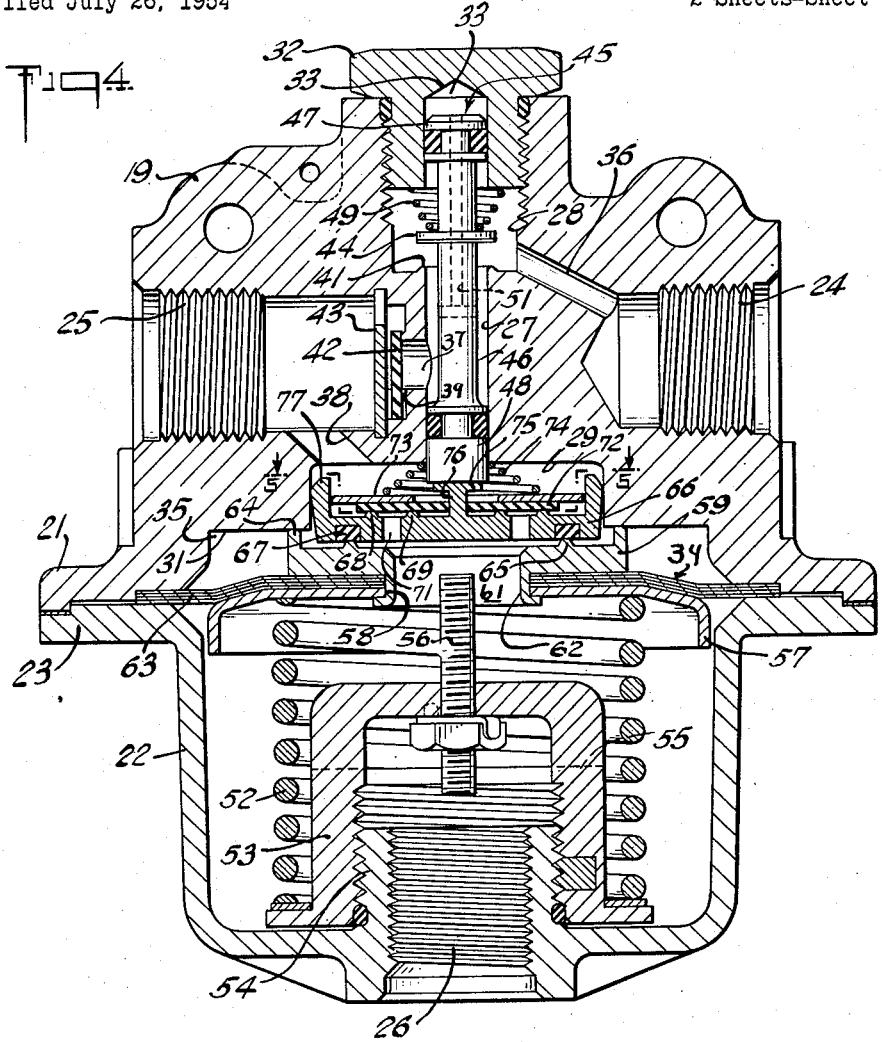
Figure 5:
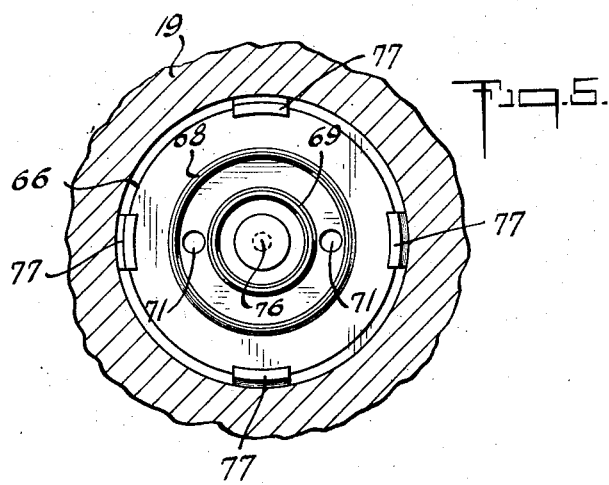

Fig. 4 is a view in longitudinal section, enlarged with respect to Figs. 2 and 3, and taken substantially along the line 4—4 of Fig. 3; and Fig. 5 is a view in cross section taken substantially along the line 5—5 of Fig. 4.

Figure 1:
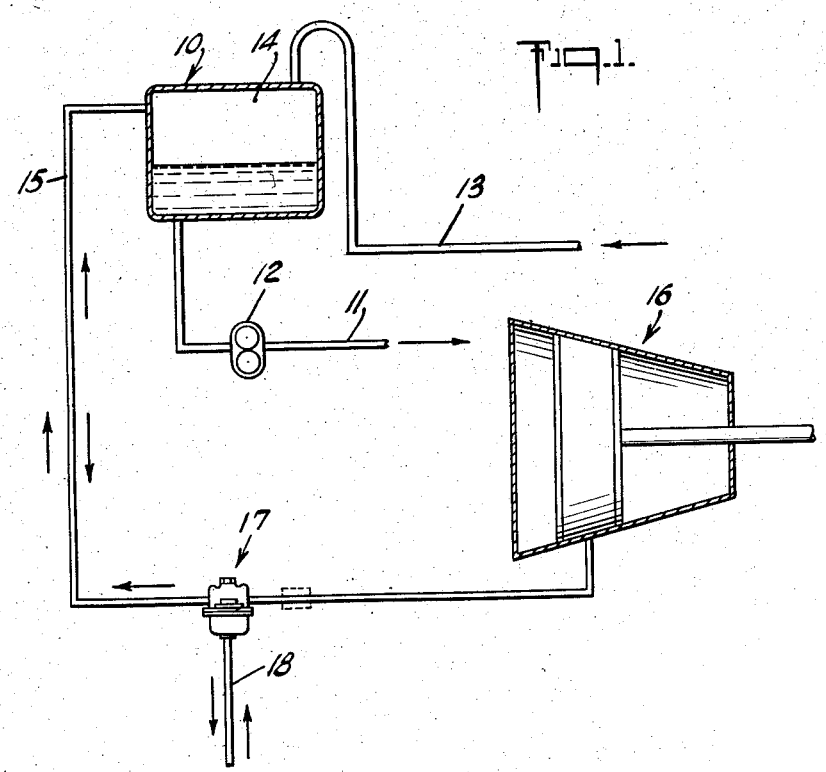
Fig. 1 is a fragmentary diagram of a hydraulic reservoir pressurizing circuit including a regulator valve in accordance with the illustrated embodiment of the invention.

Referring to Fig. 1, in the illustrative system a hydraulic reservoir 10 is connected by a line 11 to the hydraulic system, the oil or other hydraulic liquid in the reservoir being drawn therefrom and delivered under pressure through the line 11 by means of a pump 12. The oil returns to the reservoir by way of a line 13. Above the oil level in the reservoir 10 is an air space 14 varying in volume with variations in depth of the oil in the reservoir, the air in the space 14 being normally maintained under a predetermined pressure, for example, nine to ten pounds per square inch, to exert a pressure on the contained hydraulic oil.

Air for pressurizing the reservoir 10 is delivered thereto by way of a line 15 which extends as a bleed line from an engine compressor 16 generating air pressures of a variable value, for example on the order of fifteen to one hundred fifty pounds per square inch. Interposed in the line 15 is a pressure regulator valve 17 which is the subject of this invention. It is a function of the valve 17, as noted, to regulate the air pressure in the space 14 at a predetermined value and it accomplishes this function by admitting air under pressure from the compressor 16 until the selected value in the reservoir is achieved and by then discontinuing supply of the pressure fluid. If oil is pumped out of the reservoir, lowering the level therein, or if the aircraft loses altitude, the regulator valve 17 admits more air to the reservoir in order to maintain the selected pressure on the oil. If the oil level in the reservoir rises, or when the aircraft gains altitude, the regulator valve functions to relieve the air or oil pressure in the reservoir at a selected high value, for example a value on the order of twelve to thirteen pounds per square inch. If the hydraulic system is overloaded, or too full, oil may escape from the reservoir 10 by way of the line 15 to the regulator valve 17 and from this point suitably vented by a line 18 communicating with the atmosphere. In the event of a vacuum condition in the reservoir 10, atmospheric pressure is admitted through the vent line 18, valve 17 and line 15. An integrally constructed check valve in the valve 17 prevents the reservoir pressure from bleeding off back into the inlet side of the valve 17 after the engine has been shut down.

Considering the structural details of the regulator valve 17, the regulator unit comprises a cast body 19 having a flange 21 at one end thereof. A hollow cap 22 acts in effect as an extension of the body 19, having a flange 23 in mating relation to the flange 21 and bolted thereto to make of the body 19 and cap 22 a substantially unitary structure.

The body 19 is formed with an internally threaded inlet opening 24 receiving that portion of the line 15 extending from the compressor 16. The body 19 also has, in generally opposed relation to the inlet opening 24, an internally threaded outlet opening 25 receiving that portion of the line 15 extending to the reservoir 10. The cap 22 has a central, axial opening 26 receiving the vent line 18.

The body 19 further is formed with a longitudinal bore 27 and upper and lower counterbores 28 and 29 respectively. The lower part of the body 19 is further machined to provide a recessed ledge 31 in surrounding relation to the counterbore 29.

The counterbore 28 is closed by a cap plug 32 screwed therein and having a central recess 33 opening into the counterbore 28. The counterbore 29 is closed by a diaphragm assembly 34, the interior of such counterbore and the space defined by the machining of ledge 31 forming what may be termed a pressure chamber 35 to one side of or above the diaphragm assembly.

The inlet opening 24 is connected to the counterbore 28 by a passage 36. The outlet opening 25 is connected to the counterbore 28 by way of an opening 37 into the bore 27 and is further connected to counterbore 29, and to pressure chamber 35 of which it is a part, by an opening 38. The periphery of passage 37 is formed with a valve seat 39 facing into the outlet opening 25. The peripheral edge of the bore 27, where it opens into the counterbore 28, is formed with a valve seat 41 facing into the counterbore 28. Engageable with the valve seat 39 is a flexible check valve disc 42 held in cooperative relation with the seat 39 by a retainer 43. Engageable with the valve seat 41 is a valve shoulder 44 constituting an integral annulus on a throttle valve member 45. The member 45 includes, in addition to the shoulder 44, a longitudinal stem portion 46 of less diameter than the bore 27 and end piston portions 47 and 48 having a sliding fit respectively in the recess 33 in cap 32 and in the lower end of the bore 27. The throttling valve member is longitudinally disposed in the bore 27, with the shoulder 44 in counterbore 28 and with the piston portion 47, as noted, extending into the recess 33 of cap 32.

It will be apparent that inflowing air received at inlet opening 24 is permitted to pass by way of passage 36, counterbore 28, bore 27, and passage 37 to the outlet opening 25 as long as valve shoulder 44 occupies an elevated or open position with respect to the valve seat 41. Should the shoulder 44 descend to engageemnt with the valve seat 41 then flow from the inlet opening 24 to the outlet opening 25 is cut off. A spring 49 is seated on the cap 32 and urges the throttling valve member 45 downward or in a direction to engage the shoulder 44 with the seat 41. The check valve 42 functions, of course, to admit flow to the opening 25 by way of the passage 37 but denies flow in a reverse direction.

The stem 46 of the throttling valve member 45 is formed with an internal passage 51 which opens through the piston portion 47 into the recess 3, at its one end, and opens into the bore 27 at its other end. The passage 51 provides for pressure balance of the throttling valve member, permitting such member to be positioned and to be maintained in selected positions independently of variations in the inlet pressure as supplied to counterbore 28.

The positioning of the throttling valve member 45 is a function of movement of the diaphragm assembly 34 which in turn is influenced by the difference in value between the pressure at outlet 25 and the total resistance value of air at atmospheric pressure plus the pressure of a compression spring 52. Thus, the pressure chamber 35 on one side of the diaphragm assembly exhibits outlet pressure by reason of the passage 38. On the opposite side of the diaphragm assembly is the interior of cap 22 which is open to atmosphere through vent opening 26. The spring 52 is disposed in underlying relation to the diaphragm assembly and is interposed between the diaphragm assembly and an adjustable carrier member 53 rotatably mounted on an internal boss 54 through which opening 26 extends. The carrier member 53 is formed with slots 55 through which the interior of the cap 22 communicates with vent opening 26. The carrier 53 further mounts an upright adjustable screw stud 56.

The diaphragm assembly 34 comprises a retainer member 57 receiving the spring 52 and having a central opening 58 into which and through which projects the screw stud 56. A plate member 59 overlies the retainer 57 and has a central opening 61 defined in part by a central projection 62 which extends into and through the opening 58 in the retainer 57 and has its end portion turned over upon the retainer 57 in a manner to interengage the plate 59 and retainer 57 in a unitary assembly. A flexible diaphragm element has its peripheral portion clamped between the body 19 and the cap 22 and has its inner peripheral portion received and clamped between the retainer 57 and the plate 59.

The under surface of the plate 59 is in intimate contacting relation to the diaphragm element 63. The opposite or upper surface thereof is formed with an upturned outer peripheral edge 64 which makes contact with the ledge 31 and is further formed with an annular ridge 65 defining a valve seat. In overlying relation to the plate 59 are components of a relief valve assembly forming a part of the diaphragm assembly 34, including a circular body 66 having a ring seal 67 inset in its lower surface in registry with the annular ridge 65. On the upper surface of the body 66 are two concentric annular ridges 68 and 69 between which is a series of openings 71 through the body 66. A disc valve 72 rests on the ridges 68 and 69 which serve as seats therefor. A retainer 73 overlies the disc valve 72 and is urged by a spring 74 in a direction to maintain the valve 72 on the seats 68 and 69 and thereby deny fluid flow through the openings 71. The spring 74 seats in the bottom of counterbore 29 and is in part guided by the piston portion 48 of the throttling valve 45, which portion extends into the counterbore 29. The body 66 is formed with an upstanding table 75 and interconnecting neck portion 76 providing a rest for the portion 48 of the throttling valve member. The body 66 further is formed with peripheral upstanding lugs 77 which are received in the counterbore 29 and guide the body 66 therein as well as center the retainer 73 in the assembly.

In the operation of the relief valve mechanism, when the pressure at the outlet 25 reaches a high value sufficient to overcome the opposition of the spring 52 and of atmospheric pressure within the cap 22 the diaphragm assembly will be pushed downwardly beyond the point of contact of body 66 with the stud 56 whereupon continued downward motion of diaphragm element 63 and plate 59 is accomplished relatively to the body 66 resulting in a withdrawal of the ridge 65 from the seal insert 67 and an opening of flow from outlet 25 through passage 38 and pressure chamber 35, through the diaphragm assembly by way of opening 61 and out to atmosphere by way of the cap 22 and opening 26 therein. Also, if the pressure in outlet opening 25 drops below atmospheric pressure by an amount sufficient to overcome the spring 74 the disc valve 72 will be raised from its seat on ridges 68 and 69 and open a path of reverse flow from atmosphere to the outlet 25 by way of opening 61, openings 71, chamber 35, and passage 38. It will be understood, of course, that by reason of its position of rest on the table 75 the throttling valve member 45 normally partakes of motions of the diaphram assembly with resultant adjustments of the valve shoulder 44 with respect to the valve seat 41.

What is claimed is:

1. A pressure regulating valve, including a valve body having an inlet, an outlet and a vent opening, passages respectively interconnecting said inlet and said outlet and said outlet and said vent, a diaphragm assembly installed across said vent to respond to pressure differences between said outlet and said vent, sealing means forming a part of said diaphragm assembly and separable from the diaphragm proper to permit flow from the outlet to the vent at a predetermined high pressure difference, disc valve means forming a part of said diaphragm assembly and separable from the diaphragm proper to permit flow from the vent to the outlet in response to a predetermined drop in outlet pressure beneath vent pressure, and a throttling valve movable by and under the control of said diaphragm assembly controlling flow from said inlet to said outlet.

2. A pressure regulating valve according to claim 1, characterized by a check valve between said inlet and said outlet preventing reverse flow from said outlet to said inlet.

3. A pressure regulating valve, including a valve body having a bore and counter bores at the opposite ends thereof, a cap closing one of said counter bores, a flexible diaphragm assembly closing the other one of said counter bores, an inlet communicating with said one counter bore and an outlet communicating with said bore between the ends thereof and with said other counter bore, a throttling valve slidably mounted in said bore and having its ends projecting into said counter bores, one end thereof resting on said diaphragm assembly and the other end being formed with a valve shoulder for throttling flow from said one counter bore into said bore in response to flexing of said diaphragm assembly, a spring opposing motion of said diaphragm assembly under the influence of pressure at said outlet, said diaphragm assembly being exposed also to a relatively constant pressure acting in the direction of said spring, and said diaphragm assembly comprising a central metallic ferrule open to the opposite sides of the diaphragm, said ferrule having on one side thereof an elevated annular valve seat, a plate resting on said annular seat and normally closing the opening through said ferrule, said plate having at least one opening therethrough communicating said other counter bore with the opposite side of said diaphragm assembly through said ferrule, a disc normally closing said last mentioned opening, and a spring urging said disc to a seat on said plate and said plate to engagement with said annular valve seat.

References Cited in the file of this patent

UNITED STATES PATENTS

| | | |
|---|---|---|
| 1,210,891 | Blanchard | Jan. 2, 1917 |
| 2,053,931 | Work | Sept. 8, 1936 |
| 2,252,152 | Work | Aug. 12, 1941 |
| 2,664,674 | Niesemann | Jan. 5, 1954 |
| 2,684,838 | Rush | July 27, 1954 |
| 2,707,966 | Taplin | May 10, 1955 |
| 2,761,464 | Faust | Sept. 4, 1956 |